Sept. 4, 1951 C. A. BERGFORS 2,566,918
BINARY-DECADE COUNTER
Filed Dec. 1, 1948
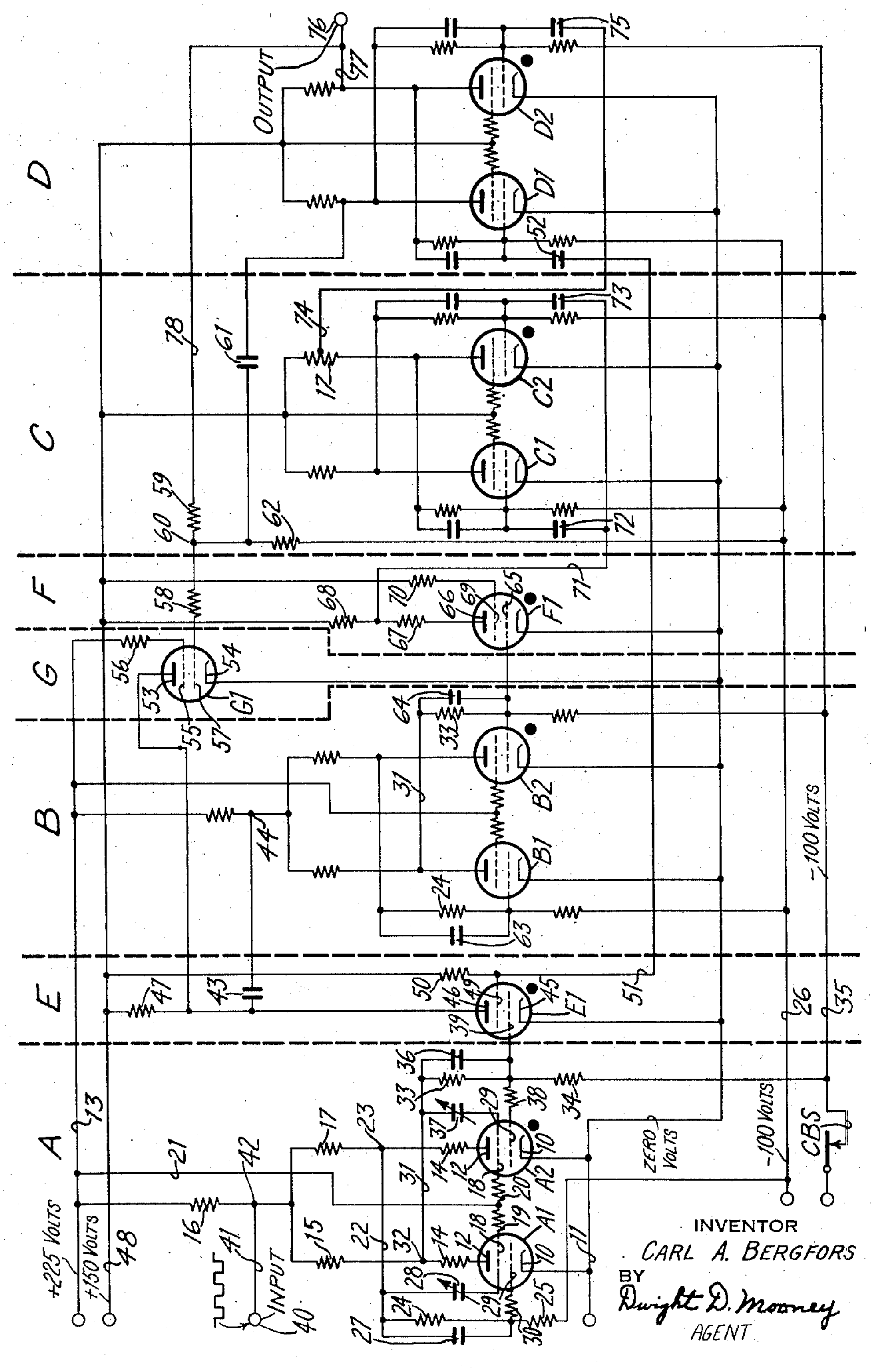
INVENTOR
CARL A. BERGFORS
BY Dwight D. Mooney
AGENT Patented Sept. 4, 1951 2,566,918

UNITED STATES PATENT OFFICE 2,566,918

BINARY-DECADE COUNTER

Carl A. Bergfors, Yonkers, N. Y., assignor to International Business Machines Corporation, New York, N. Y., a corporation of New York Application December 1, 1948, Serial No. 62,852

15 Claims. (Cl. 250—27)

This invention relates to electronic counters and more particularly to an inherently binary counter utilizing a series of trigger circuits, inter-connected in a novel manner so that it can count in the decimal system, each trigger circuit comprising a pair of grid controlled tubes and having two conditions of stability. These conditions of stability are alternately assumed by each trigger circuit in response to negative input pulses of predetermined characteristics. One condition of stability herein designated as the "on" condition is represented by the right-hand tube of the pair being non-conductive and the left-hand tube of the pair being conductive. The other condition of stability when the right-hand tube is conductive and the left-hand tube is non-conductive is designated herein as the "off" condition.

Means have previously been provided for converting an inherently binary counter to a decade counter. Generally, one such means involves connections, for feeding back pulses from higher to lower trigger circuits, in a series of such circuits, through a capacitive circuit, so that the counter has an output for each ten entries, received by it. Such use of capacitive feedback, to effect the conversion from binary to decade counting, is disadvantageous in that such feedback circuits are frequency discriminative and, since the maximum frequency of the supply pulses that may be employed depends upon the frequency response of the feedback circuits, the maximum switching or counting speed of the counter is limited. Thus such counters utilizing capacitive feedback cannot be operated at the high speed of the instant application disclosed herein.

Other counters of the prior art utilize connections without any coupling tubes between the triggers for feeding pulses, from a preceding trigger circuit to a subsequent trigger. This increases the load on the preceding trigger thereby seriously decreasing the highest operating speed of the counter so that trigger circuits, which are, per se, of the type employed in the instant application, when so directly connected in series, produce a counter whose maximum operating speed is lower than that of the permissible operating speed of the trigger circuits, per se.

Accordingly, an object of this invention is to convert an inherently binary counter into a decade counter capable of counting entries at a speed commensurate with the speed at which the separate trigger circuits, per se, are capable of counting.

Another object is to provide an improved decade counter from an inherently binary counter wherein interaction is prevented between trigger circuits which are electronically coupled to one another.

Still another object is to provide an improved decade counter from an inherently binary counter in which a coupling tube circuit, of low input capacitance, is directly connected to the first trigger circuit and coupled to the second trigger circuit whereby the load on the first trigger circuit is substantially reduced when pulses are fed from the first to the second trigger.

A further object is to provide novel means for feeding the output of the first trigger circuit to the fourth trigger circuit to change the condition of stability of the fourth trigger circuit, at a predetermined time in the cycle of counter operation, without placing an additional load circuit on the first trigger.

Another object is to provide a coupling tube circuit comprising a grid controlled tube, intermediate the first and second trigger circuits, serving the quadruple functions, of preventing electrical interaction between these two triggers, conveying a pulse to the second trigger while maintaining the load on the first trigger at a low value, conveying a pulse to a fourth trigger to operate it at a predetermined time during the cycle of counter operation and preventing operation of the second trigger in response to the output of the first trigger when it conveys a pulse to the fourth trigger.

Still another object is to provide means including a blocking tube which is rendered conductive, by a change in the stable condition of the fourth trigger in response to the eighth counter entry, to maintain the grid controlled tube intermediate the first and second triggers at a low plate potential to prevent, thereby, a change in the stable condition of the second trigger when the first trigger is changed from "on" to "off" in response to the tenth counter entry.

A further object is to minimize the effect of the interelectrode capacity of the tubes of the first and second triggers thereby increasing their speed of operation and the speed of operation of the counter.

A still further object is to increase the operating speed of the counter by operating the first and second triggers with negative pulses, impressed on the plates of their tubes, instead of on their control grids.

A still further object is to amplify and reshape the trigger output pulses in order to increase the upper frequency limit of counter response.

Other objects of the invention will be pointed out in the following description and claims and illustrated in the accompanying drawing, which discloses, by way of example, the principle of the invention and the best mode, which has been contemplated, of applying that principle.

The single figure comprises a circuit diagram of a preferred embodiment of the novel counter.

Referring to the drawing, the novel counter comprises four trigger circuits labeled A, B, C and D; isolation and coupling tube circuits labeled E and F, and a blocking tube circuit labeled G; the four trigger circuits and the tube circuits E, F and G being shown as separated by broken vertical lines. Trigger circuits A, B, C and D include two grid-controlled tubes each designated A1 and A2, B1 and B2, C1 and C2 and D1 and D2, respectively. The tubes of each trigger circuit are illustrated as tetrodes, trigger A employing two types 807 tubes and triggers B, C and D each employing two type 6L6 tubes.

Each trigger produces an output for each two entries received, which output operates the next higher trigger. Since trigger A must, per se, operate at a higher speed than trigger B, trigger B at a higher speed than trigger C, and trigger C at the same speed as trigger D, it is obvious that the use of tubes of the same characteristics, in triggers A, B, C and D, would cause trigger A to limit the maximum operating speed of the counter. Triggers B, C and D, in that order, have a lesser effect on limiting the speed of the counter. For this reason triggers A, B and C only are provided with coupling tubes. Type 807 tubes are employed in trigger A because the characteristics of this type tube are more suitable to operation at the relatively high frequencies required of trigger A. Other novel means employed to increase the maximum speed of the counter include, plate keying of triggers A and B, and isolating the feedback coupling effect of triggers A and B, from each other, and from triggers C and D. These means will be described in detail later.

As stated, each trigger circuit A to D, inclusive, has two conditions of stabiilty designated as "on" and "off," the respective conditions of the two tubes of each trigger being as described above. Thus, in the drawing the triggers, at the preselected starting condition, are indicated as "off," the dot to the right of the right-hand tube of each trigger indicating that this right-hand tube is conductive. The dot at the right-hand sides of the tubes E1 and F1 indicates that these tubes are plate current conductive when the triggers A, B, C and D are as shown.

Solely for the purpose of clarification of the invention, the description thereof will be undertaken with reference to the values of applied voltage and the values of resistance and capacitance employed therein these values being understood to be indicative of one set of values found to be desirable. The operation of trigger A will be described in detail, it being understood that triggers B, C and D are identical with A, except as otherwise pointed out herein.

Cathodes 10 of tubes A1 and A2 are connected directly to a zero volt line 11. Plate 12 of tube A1 is connected to a +225 volt line 13 through a parasitic suppressor resistor 14 and resistors 15 and 16 in series. Plate 12 of tube A2 is similarly connected to the +225 volt line 13 through a parasitic suppressor resistor 14, and a resistor 17 connected in series with the resistor 16. Screen grids 18 of tubes A1 and A2 are connected to the +225 volt line 13 through resistors 19 and 20, respectively, and a lead 21. Resistors 14 each have a valve of 47 ohms and resistors 15, 16, 17, 19 and 20 each have a value of 1000 ohms.

A lead 22 connected to a point 23 intermediate a resistor 14 and resistor 17 thus joins the plate of tube A2 to the upper end of a voltage divider consisting of resistors 24 and 25, each of 21,000 ohms. The lower end of this divider is connected to a minus 100 volt bias line 26. In parallel with the resistor 24 is a capacitor 27 of 0.00215 microfarad. Connected intermediate the point 23 in the plate circuit of tube A2 and screen grid 18 of tube A1 is an adjustable, neutralizing capacitor 28 of 0.000013 microfarad. The control grid 29 of tube A1 is connected to a point intermediate the resistors 24 and 25 through a parasitic suppressor resistor 30 having a valve of 47 ohms.

Similarly, a lead 31 is connected from a point 32, intermediate the resistors 14 and 15, to the upper end of a voltage divider consisting of resistors 33 and 34, each of 21,000 ohms. The lower end of the divider is connected to a cancel bias line 35 which is normally at a potential of minus 100 volts. In parallel with resistor 33 is a capacitor 36 of 0.000215 microfarad. Connected intermediate the point 32 in the plate circuit of tube A1 and the screen grid 18 of tube A2 is an adjustable neutralizing capacitor 37 of 0.000013 microfarad. The control grid 29 of tube A2 is connected via a parasitic suppressor resistor 38 of 47 ohms to a point between the resistors 33 and 34 and to a control grid 39 of the tube E1, of the tube circuit labeled E, to thus control conduction through E1, in a predetermined cyclic fashion as described later.

The counter is supplied with an input terminal 40 to which are applied the entries to be counted which comprise a series of negative pulses having characteristics suitable to effect actuation of trigger A when applied to the terminal 40. Terminal 40 is connected via a lead 41 to a point 42, between the resistor 16 and resistors 15 and 17, of trigger A so that these pulses are applied to the plates of tubes A1 and A2 of this trigger. It is to be particularly noted that the constants of the trigger circuits are so chosen that positive pulses of an amplitude equal to that of the negative pulses will not switch the triggers.

In the zero or preselected starting condition of the counter, each trigger is "off," i. e. the right-hand tube of each trigger is conductive as shown, and the left-hand tube is non-conductive. Each of these right-hand tubes has its control grid connected to the cancel bias line 35. A cancel bias switch CBS is provided to switch or reset the triggers to the preselected starting condition. Resetting is accomplished by first opening and then closing this switch CBS. When switch CBS is opened the grid potential of each of the right-hand tubes rises slightly above the zero bias value, thus rendering these tubes conductive. This in turn causes the plate potential of the right-hand tubes to drop to its low value, as do the grids of the left-hand tubes, causing the left-hand tubes to be nonconductive. The plate of the left-hand tubes are therefore at a high potential, causing the right-hand tubes to be maintained in conducting status even after switch CBS is closed.

When a negative pulse is applied to the terminal 40, it causes the potential at the plates of both tubes A1 and A2 to decrease. This decrease in plate potential is transmitted via capacitors 27 and 36 to the control grids 29 of tubes A1 and A2. The decrease in control grid potential of tube A1, has no direct effect on that tube, since its control grid is already below cut-off potential and tube A1 is already non-conductive. The decrease is potential, however, at the control grid, of the conducting tube A2, renders it non-conductive, with a resulting rise in potential at its plate which rise if applied, via a circuit comprising lead 22, capacitor 27, and resistor 24 to the control grid 29 of tube A1 to start plate current conduction therein. Such conduction through tube A1 causes its plate voltage to decrease which decrease is transferred via lead 31 and a circuit comprising capacitor 36, resistor 33 and resistor 38 to the control grid 29 of tube A2. In accordance with the well-known trigger action, tube A2 is maintained non-conductive, until the next negative pulse is applied to the terminal 40. Hence, the first negative pulse switches trigger A from "off" to "on."

When trigger A thus changes from "off" to "on," a negative voltage is transferred from the plate circuit of tube A1 via lead 31, and capacitor 36 to the control grid 39 of tube E1 to bias that grid below cut-off and change this tube from the conductive condition, as shown, to a non-conductive condition.

Upon application of a second negative pulse to terminal 40, the control grid of tube A1 is reduced in potential to below cut-off thereby changing the tube from its conductive to a non-conductive condition and in accordance with the well-known trigger action, tube A2 becomes conductive. The increased plate voltage of tube A1 is transferred to the control grid of tube A2 to cause A2 to remain conductive until the next negative pulse is impressed on the terminal 40. Hence, the second negative pulse causes trigger A to be switched from "on" to "off." When trigger A is in its "off" status, the control grid 29 of tube A2 is at zero bias, as is the direct connected grid of tube E1. Therefore, tube E1 is rendered conductive. When this tube is changed from a non-conductive to a conductive condition, its plate voltage drops and this drop in voltage is transferred, by a capacitor 43 of 0.0001 microfarad, to a point 44 in the plate circuit of the tubes of trigger B, to switch that trigger to its opposite status.

Triggers A and B are keyed in response to negative pulses applied to their plate circuits thereby to increase their individual operating speed thus permitting operation of the counter at a higher speed than would be possible by keying of the capacitively coupled control grids of the tubes such as is employed to key trigger C.

Cathode 45 of tube E1 is connected to the zero volt line 11 and plate 46 is connected through a resistor 47 of 1000 ohms to a +150 volt line 48. Screen grid 49 is connected to the +150 volt line 48 through a resistor 50 of 2700 ohms and is coupled to the control grid of tube D1 via a lead 51 and a capacitor 52 of 0.00004 microfarad.

Tube E1 is conductive when trigger A is "off" and is non-conductive when trigger A is "on." The positive pulse applied from the plate of tube A1 to the control grid 39 of tube E1 when trigger A is changed from "on" to "off", is usually effective to render tube E1 conductive to in turn cause the tube E1 to apply a negative pulse from its plate, via capacitor 43 to the point 44 in the plate circuit of the tubes of trigger B, to change the stable condition of that trigger. Employing tube E1, intermediate triggers A and B in the manner as shown in contra-distinction to coupling the triggers directly, decreases the load on trigger A and also prevents capacitive feedback interaction between the triggers to thus permit counter operation at a higher speed. It has been found that directly coupling the control grid 29 of the tube A2 to the control grid 39 of the tube E1 places a lesser load on trigger A than would result if trigger A were coupled directly to triggers B and D.

A blocking tube G1, in the tube circuit labeled G, has its plate 53 directly connected to the plate 46 of tube E1 and its cathode 54 connected to the zero volt line 11. Its screen grid 55 is connected via a resistor 56 of 1000 ohms to the +225 volt line 13 and its control grid 57 is connected, via resistors 58 and 59, to the plate of tube D2 of trigger D. These resistors have values of 1200 and 470,000 ohms, respectively, and are connected in series as shown. Point 60 intermediate these resistors 58 and 59 is coupled via a capacitor 61 of 0.00001 microfarad to the plate of tube D1 of trigger D and is connected via a resistor 62 of 470,000 ohms, to the minus 100 volt line 26.

The circuit components of triggers B, C and D, which are not numbered, are similar to the corresponding components of trigger A. In trigger B, a capacitor 63 in parallel with the resistor 24 has a value of 0.00025 microfarads as does a capacitor 64 in parallel with the resistor 33. The capacitors of triggers C and D, corresponding to the capacitors 63 and 64 of trigger B, are of the same value.

An isolation and coupling tube F1, of tube circuit F, prevents undesired feedback interaction between the triggers B and C, reduces the load on trigger B and allows both triggers to operate at a speed approximating that at which either would operate, if connected to no other circuit, thereby removing a limitation on the speed of counter operation which is present in counters using direct coupled triggers.

When tube B1 of trigger B becomes non-conductive, i. e. when trigger B is switched "off," a positive voltage is conveyed over lead 31 of trigger B and the capacitor 64 to a control grid 65 of tube F1 to render it conductive. Tube F1 is conductive when trigger B is "off" and each time it becomes conductive it conveys a negative pulse to trigger C via a line 71 and condensers 72 and 73, to change the stable condition of that trigger.

The plate 66 of tube F1 is connected via resistors 67 and 68, each of 500 ohms, to the +150 volt line 48. Its screen grid 69 is connected, via a resistor 70 having a value of 1000 ohms, to the +150 volt line 48. It is to be particularly noted that the screen grid resistor 50 of 2700 ohms, of tube E1, is larger than the screen grid resistor 70, of 1000 ohms, of tube F1, because the negative pulse from the screen grid 49 of tube E1 must be of sufficient value to change the stable condition of trigger D. The novel manner of switching trigger D and returning the counter to the preselected starting condition will be described later.

The negative pulse from the plate circuit of tube F1 which is used to change the stable condition of trigger C is, as stated previously, conveyed to that trigger over the lead 71 connected, at one end, intermediate the resistors 67 and 68 in the plate circuit of tube F1 and at the other end is coupled via capacitors 72 and 73, each having a value of 0.00004 microfarad, to the control grids of tubes C1 and C2.

A tap on the plate resistor 17 of tube C2 of trigger C is coupled to the control grid of tube D2 of trigger D via a lead 74 and a capacitor 75 having a value of 0.00004 microfarad. When trigger C is changed for "off" to "on," a positive pulse is applied via this lead 74 to the control grid of tube D2 but this pulse does not affect the stable condition of trigger D, since, when it is applied, the tube D2 is already conductive as is seen from the table below. Each time, however, that trigger C is changed from "on" to "off," a negative pulse is applied via this lead 74 to the control grid of tube D2, which switches trigger D from "off" to "on," as is also evident from the table below.

The counter is provided with an output terminal 76 connected directly to the plate of tube D2 via a lead 77. This terminal, as will be apparent presently, provides a negative output for each ten negative pulses applied to the counter input terminal 40. The positive output which appears at this terminal 76 when trigger D changes from "off" to "on" is not employed in this invention.

The operation of the individual trigger circuits has been described with reference to the operation of trigger A and the effect of the first two negative pulses applied to the counter input terminal 40 has been set forth. The novel means for converting from a straight binary to decade counting and the operation of the entire counter circuit will be described with reference to the drawing and the following table which illustrates the condition of triggers, A, B, C, and D and of the tubes of circuits E, F and G, for one complete cycle of counter operation. In the table, "X" indicates the "on" condition of the respective trigger circuits or the conductive condition of tubes E1, F1 and G1 of tube circuits E, F and G respectively, while "O" indicates the "off" condition of the respective trigger circuits or the non-conductive condition of the tubes E1, F1 and G1.

| Counter Input Pulses | Trigger Circuits | | | | Tubes | | |
|---|---|---|---|---|---|---|---|
| | A | B | C | D | G1 | E1 | F1 |
| 0 | O | O | O | O | O | X | X |
| 1 | X | O | O | O | O | O | X |
| 2 | O | X | O | O | O | X | O |
| 3 | X | X | O | O | O | O | O |
| 4 | O | O | X | O | O | X | X |
| 5 | X | O | X | O | O | O | X |
| 6 | O | X | X | O | O | X | O |
| 7 | X | X | X | O | O | O | O |
| 8 | O | O | O | X | X | X | X |
| 9 | X | O | O | X | X | O | X |
| 10 | O | O | O | O | O | X | X |

As shown in the table and as set out above the first counter input pulse switches trigger A "on" and the second counter input pulse switches trigger A "off" and trigger B "on".

The third input pulse switches trigger A "on" and has no further effect except to render tube E1, non-conductive.

The fourth pulse switches trigger A "off" and the positive pulse from the plate of tube A1 causes tube E1 to be rendered conductive to thus transfer a negative pulse from its plate 46 via capacitor 43 to the point 44 in the plate circuit of the tubes of trigger B, thereby causing trigger B to be switched "off." When trigger B is switched "off," the resulting positive pulse on the plate of tube B1 is conveyed to the control grid 65 of tube F1 to render it conductive. The resulting decrease in voltage at its plate 66 causes a negative pulse to be transferred via lead 71 to the control grids of the tubes of trigger C switching it from "off" to "on." This switching of trigger C is not effective to switch trigger D since it causes a positive pulse, only, to be applied to the control grid of tube D2, which tube is already conductive.

The fifth pulse switches trigger A "on" thus causing tube E1 to become non-conductive, which produces no triggering action.

The sixth pulse switches trigger A "off," and causes tube E1 to become conductive whereupon plate circuit conduction of tube E1 produces a negative pulse to switch "on" trigger B, which in turn causes tube F1 to become non-conductive.

The seventh negative pulse switches trigger A "on" which renders the tube E1 non-conductive. Thus it is seen that the triggers A, B, C and D are operated, in normal binary fashion, in response to the first seven pulses applied to counter input terminal 40 and that the means for converting the counter to decade operation have not as yet begun their cycle of operation.

The eighth pulse switches trigger A "off" which renders tube E1 conductive, as shown in the table, which, in turn switches trigger B "off" to render tube F1 conductive, which, in turn, switches trigger C "off." The switching "off" of trigger C causes a negative pulse to be applied to the control grid of tube D2 to thus switch trigger D "on." When trigger D switches "on," the plate voltage of tube D2 rises which rise is transferred via leads 77 and 78 and resistors 59 and 58 to the control grid 57 of tube G1 of tube circuit G, to cause G1 to conduct. This rise of voltage at the plate of tube D2 is sufficient to cause tube G1 to conduct, because the point 60, intermediate resistors 59 and 62, is at a high voltage due to the fact that these resistors are connected in series between the minus 100 volt line 26 and the plate of tube D2 which is connected via its plate resistor to the +150 volt line 48. When tube G1 conducts its plate voltage drops. Since the plates of blocking tube G1 and tube E1 are connected in parallel, and since E1 was rendered conductive by the eighth pulse, the voltage drop at the plate of G1 renders E1 substantially non-conductive, and positive voltage applied to its control grid 39 cannot produce voltage variations in its plate circuit and therefore the counter input pulses are ineffective to switch trigger B from its assumed "off" condition as long as tube E1 is held non-conductive, as will be apparent from the following.

The ninth pulse switches trigger A "on," which produces a negative voltage on grid 39 of E1, which is ineffective since the plate voltage of tube E1 is held down while tube G1 is conducting.

The tenth pulse switches trigger A "off" thereby applying a positive voltage to the control grid 39 of E1. The application of this positive voltage, however, does not cause a further drop in plate potential because the voltage at the plate of E1 is still maintained at a low value and thus no negative pulse is passed through capacitor 43 to the trigger B. Triggers B and C remain, therefore, in the "off" condition as shown in the table above. This positive voltage, however, applied to the control grid of tube E1 while unable to reduce plate potential of the parallel connected plates, does cause the screen grid to become highly conductive. When such screen grid conduction occurs, with the ensuing drop in voltage across screen grid resistor 50, a negative pulse is transferred via lead 51 and capacitor 52 to the control grid of tube D1 to thus switch trigger D from "on" to "off," whereupon a negative voltage is transferred from the plate of tube D2 to the output terminal 76, to indicate that ten has been counted by the counter. At the same time, a negative voltage is transferred from the plate of tube D2 via leads 77 and 78 and resistors 59 and 58 to the control grid 57 of blocking tube G1 to render that tube non-conductive. It is to be particularly noted that when there is normal plate circuit conduction in tube E1, the voltage drop across the screen grid resistor 50, which drop is transferred via lead 51 and capacitor 52 to the control grid of tube D1, is not sufficient to switch trigger D from one stable condition to the other. When tube G1 becomes non-conductive, as just described, in response to the negative voltage transferred over leads 77 and 78, its plate voltage rises, thereby permitting the plate voltage of tube E1 to rise, so that this tube is no longer blocked. This completes one full cycle of counter operation and the counter circuit is now again in the preselected zero condition.

When trigger D was switched from "on" to "off," by the tenth pulse, a positive pulse from the plate on tube D1 is transferred via capacitor 61 and resistor 58 to the control grid 57 of tube G1. This positive pulse delays the change of tube G1 from its conductive to its non-conductive condition in response to the negative voltage applied to its control grid from the plate of tube D2 and therefore also delays the conduction of the tube E1. The purpose of this delay is to make certain that the switching of trigger A, by the tenth input pulse, will not result in the transfer of a negative pulse through tube E1 to trigger B to switch that trigger "on."

Trigger B is not switched, when tube E1 finally does become conductive, because the plate voltage of E1 was already low, prior to its conduction, due to the conduction of the tube G1. Actually the negative pulse, transferred through capacitor 43 when the tube E1 becomes conductive, has a value less than 10 volts, which is far too small to effect a switching of the trigger B.

The novel means for blocking and artificially advancing the operation of the counter and the novel inter-connection of the first and second trigger circuits make possible a counter having an operating speed commensurate with that of the trigger circuits, per se: This novel counter operates successfully at frequencies up to 350 kc., which is considerably higher than that of any known counter.

While there have been shown and described and pointed out the fundamental novel features of the invention as applied to a preferred embodiment, it will be understood that various omissions and substitutions and changes in the form and details of the circuit illustrated and in its operation may be made by those skilled in the art without departing from the spirit of the invention. It is the intention, therefore, to be limited only as indicated by the scope of the following claims.

What is claimed is:

1. An electronic counter including four trigger circuits each comprising a first and second, cross-coupled, plural grid tube, one of said tubes being placed alternately in conductive and non-conductive conditions of stability and the other, vice versa, in response to the receipt of pulses; means for placing said trigger circuits in a preselected starting condition; voltage means for applying operating voltages to the tube elements of said counter; plate load resistance connected between the plate of each of said tubes and said voltage means; an input terminal for said counter connected to a potential point on the plate load resistance in the first trigger circuit; a first isolating plural grid tube having its control grid connected to the second tube of the first trigger circuit, its cathode connected to said voltage means, its screen grid and plate connected to said voltage means, through separate resistors and its screen grid connected to the control grid of the first tube of the fourth trigger circuit for changing the stability of that circuit in response to each tenth negative pulse applied to said input terminal; a capacitive coupling from the plate of said first isolating tube to a potential point on the plate load resistance in the second trigger circuit; a second plural grid isolating tube having its control grid connected directly to the control grid of the second tube of the second trigger circuit and its screen grid and plate connected to said voltage means through separate resistors; a capacitive coupling from a potential point on the resistor connected to the plate of said second isolating tube to each of the control grids of the third trigger circuit; a capacitive coupling from a potential point on a plate load resistance in the third trigger circuit to the control grid of the second tube of the fourth trigger circuit; an output terminal for said counter connected to the plate of said second tube of the fourth trigger circuit and a blocking tube having its plate connected to the plate of said first isolating tube for substantially preventing plate current conduction through said first isolating tube in response to each tenth negative pulse applied to said input terminal; a resistance connecting the control grid of said blocking tube to the plate of the second tube of the fourth trigger circuit, a capacitor coupled between the plate of the first tube of the fourth trigger circuit and a potential point on the last mentioned resistance, and a grid bias resistor connected between the last mentioned potential point and said voltage means.

2. An electronic counter including four trigger circuits, each comprising a first and a second, cross-coupled, grid controlled tube, and adapted to assume alternately "on" and "off" conditions of stability in response to pulses applied thereto, parallel connected capacitive and resistive elements connecting the plate of the first tube of each trigger to the control grid of the second tube and connecting the plate of said second tube to the control grid of said first tube; voltage means for applying operating voltages to the tube elements of each trigger circuit; means for applying pulses to the plate circuit of the first trigger circuit; an isolating tube of the plural grid type connected between the first and second trigger circuits to apply a negative actuating pulse to the second trigger circuit only when the first trigger circuit undergoes a preselected change of condition of stability, means coupling the screen grid of said isolating tube to the control grid of the first tube of the fourth trigger circuit for changing the condition of stability of the fourth trigger circuit in response to a lowered plate voltage condition of said tube and subsequent sufficient conduction from the cathode to the screen grid of said isolating tube upon occurrence of said preselected change in said first trigger circuit, and a blocking tube having its control grid connected to the plate of the second tube of the fourth trigger circuit and its plate connected to the plate of said first isolating tube for lowering the voltage of the plate circuit of said isolating tube when the second tube of the fourth trigger circuit becomes non-conductive and for increasing the voltage of the plate circuit of said isolating tube when the second tube of the fourth trigger circuit is rendered conductive.

3. The counter of claim 2 including a second isolating tube of the plural grid type actuated only upon a change from one preselected condition of stability to the other in the second trigger circuit, and so connected as to supply a negative actuating pulse to the third trigger circuit when so actuated by said second trigger circuit.

4. A decade counter including four trigger circuits, each circuit comprising a first and a second cross-coupled plural grid tube, and having "on" and "off" conditions of stability, alternately assumed in response to pulses applied thereto, said "off" condition being represented by the non-conduction of said first tube and the simultaneous conduction of said second tube and said "on" condition being represented by the conduction of said first tube and the simultaneous non-conduction of said second tube, parallel connected capacitive and resistive elements connecting the plate of said first tube to the control grid of said second tube and the control grid of said first tube to the plate of said second tube; means for placing each of said trigger circuits in the "off" condition at starting; a first and a second isolating tube of the plural grid type connected between the first and second trigger circuits and the second and third trigger circuits, respectively; a grid controlled blocking tube, having its plate connected to the plate of said first isolating tube to control the plate voltage of that tube, and its control grid connected to the fourth trigger circuit so that said blocking tube is made conductive only when said fourth trigger circuit changes from one preselected condition of stability to the other; and a connection from the screen grid of the first isolating tube to said fourth trigger circuit to change the stability of the fourth trigger circuit when said blocking tube is conductive upon said first trigger circuit being changed from "on" to "off".

5. In a decade counter including four trigger circuits each having two conditions of stability and adapted to be changed from one condition of stability to the other, alternately, in response to negative pulses; a pair of multi-grid vacuum tubes for use in each trigger circuit; means for mutually inter-connecting the plates and control grids of each said pair of tubes; resistors connected to the plates and control grids respectively of the tubes of the first trigger circuit to reduce parasitic interference with the operation thereof; an input terminal for said counter connected to the plate circuits of said first trigger circuit; first and second plural grid vacuum tubes having their respective control grids connected to the respective control grid of one tube only of the first and second trigger circuits; a capacitive coupling from the plate circuit of said first plural grid tube to the plate circuits of the second trigger circuit, a capacitive coupling from the plate circuit of said second plural grid tube to the control grids of the tubes of the third trigger circuit; a capacitive coupling from the plate circuit of one tube only of the third trigger circuit to the control grid of one tube only of the fourth trigger circuit, and a blocking tube having its control grid, connected to the plate of said one tube of the fourth trigger circuit, and its plate connected to the plate of said first plural grid vacuum tube whereby said blocking tube, becomes conductive and causes said first plural grid vacuum tube to become substantially non-conductive upon change of said fourth trigger circuit from one preselected condition of stability to the other, and becomes non-conductive when said other condition of stability of said fourth trigger circuit is assumed to thus enable said first plural grid vacuum tube to become conductive.

6. In an inherently binary counter including four trigger circuits each having two conditions of stability; means for applying negative pulses to be counted to the first trigger circuit; a multi-grid vacuum tube connected between the first and second trigger circuits to transfer a negative actuating pulse to the second trigger circuit each time the first trigger circuit is changed to one chosen condition of stability, a connection from the screen grid of said multi-grid tube to the fourth trigger circuit; a vacuum tube connected between the second and third trigger circuit to transfer a negative actuating pulse to the third trigger circuit each time the second trigger circuit is changed to one chosen condition of stability; an output terminal for said counter connected to the fourth trigger circuit and producing one negative pulse when said fourth trigger circuit is changed to one chosen condition of stability upon application of each tenth negative pulse applied to said first trigger circuit, and a blocking tube having its control grid connected to said fourth trigger circuit and its plate connected to the plate of said multi-grid tube so that said blocking tube is rendered conductive when said fourth trigger circuit is changed from said chosen condition to its other condition, said conduction of said blocking tube rendering the plate circuit of said multi-grid tube substantially non-conductive in response to pulses from the first trigger circuit, said blocking tube being rendered non-conductive when said fourth trigger circuit is changed to said chosen condition of stability by a pulse applied over said connection from the screen grid of said multi-grid tube upon the conjoint action of said first trigger circuit changing to said chosen condition of stability and said blocking tube conducting.

7. The counter of claim 6 wherein the control grid of said blocking tube is connected to said fourth trigger circuit through a resistive connection and through a capacitive connection, said capacitive connection serving to delay the rendering of said blocking tube non-conductive.

8. In a decade counter a series chain of four trigger circuits each having a chosen condition of stability and another condition of stability and successively operable in response to negative input pulses; means for placing said triggers in said chosen condition of stability; a multi-grid tube connected between the first and second trigger circuits for changing the condition of stability of said second trigger circuit and normally having its plate circuit conductive when said first trigger circuit is in said chosen condition of stability; a grid controlled tube connected between the fourth trigger circuit and said multi-grid tube for rendering the plate circuit of said multi-grid tube substantially non-conductive in response to said other condition of stability of said fourth trigger circuit, and a connection from the screen grid of said multi-grid tube to said fourth trigger circuit for restoring the condition of stability of said fourth trigger circuit to its chosen condition once for each tenth input pulse when the plate circuit of said multi-grid tube is substantially non-conductive and the first trigger circuit is changed to said chosen condition of stability.

9. The counter of claim 8 including a capacitive coupling between said grid controlled tube and said fourth trigger circuit to delay the response of said grid controlled tube to a change in the stable condition of said fourth trigger circuit.

10. The counter of claim 8 including a multigrid tube connected between the second and third trigger circuits for changing the condition of stability of the third trigger circuit each time the second trigger circuit is changed from one chosen condition of stability to the other.

11. In a decade counter including a series chain of trigger circuits each having two conditions of stability and adapted to be changed from one to the other alternately upon receipt of pulses having predetermined characteristics; means for placing said triggers in a preselected starting condition; a multi-grid tube connected between the first and second trigger circuits to change the condition of stability of said second trigger circuit each time said first trigger circuit changes to a chosen condition of stability, said multigrid tube being normally conductive when said first trigger circuit is in said chosen condition of stability; a grid controlled tube having its plate connected to the plate of said multi-grid tube and a grid connected to a subsequent trigger circuit so that said grid controlled tube is rendered conductive and non-conductive in accordance with the condition of stability of said subsequent trigger circuit, said multi-grid tube plate circuit being non-conductive when said grid controlled tube is conductive; a connection from the screen grid of said multi-grid tube to said subsequent trigger circuit for changing the condition of stability of said trigger circuit when said first trigger is changed to said chosen condition of stability and said multi-grid tube plate circuit is non-conductive.

12. The counter of claim 11 wherein circuit means are provided to effect a predetermined delay in a change of said grid controlled tube, from the conductive status, in response to a change in the condition of stability of said subsequent trigger circuit.

13. A counter comprising chain connected trigger circuits each trigger comprising a pair of cross-coupled plural grid tubes, one of said tubes being switchable alternately to conductive and non-conductive condition and the other, vice versa, in response to pulses applied to said triggers; means for placing said triggers in a preselected starting condition; a grid controlled tube connected between successive trigger circuits in the chain for isolating the capacitive effect of at least two trigger circuits from each other, said grid controlled tube being rendered operative by one of said successive trigger circuits and serving to determine the stable condition of other trigger circuits in said chain; electronic tube means connected between said grid controlled tube and a subsequent trigger circuit in said chain for rendering said grid controlled tube ineffective to determine the stable condition of the other of said successive trigger circuits during a preselected interim of the cycle of counter operation, and means connecting said grid controlled tube to a trigger circuit subsequent in said chain to said subsequent trigger circuits to determine the stable condition of the former trigger circuit although ineffective to determine the stable condition of the said other trigger circuit of said other successive trigger circuits.

14. A counter comprising chain connected trigger circuits, each trigger circuit comprising a pair of cross-coupled plural grid tubes, one of said tubes being switchable alternately to conductive and non-conductive condition and the other, vice versa, in response to pulses applied to said trigger circuits, means for placing said trigger circuits in a preselected starting condition; a single grid controlled tube connected between two successive trigger circuits in the chain for isolating the feedback effect of at least those two trigger circuits from each other, said grid controlled tube being rendered operative by one of said successive trigger circuits in the chain and serving to determine the stable condition of the other of said successive trigger circuits; and one electronic tube circuit wherein said tube has its plate connected directly to said grid controlled tube and is connected to a subsequent trigger circuit in the chain other than said two successive trigger circuits so that said grid controlled tube is rendered ineffective by the operation of said electronic tube circuit to determine the stable condition of the said other of said successive trigger circuits in the chain during a preselected interim of the cycle of counter operation.

15. A counter comprising chain connected trigger circuits and including a first trigger circuit having, per se, the highest operating speed; a second trigger circuit having, per se, the next highest operating speed, and a subsequent trigger circuit in the chain having, per se, a lower operating speed; each trigger circuit including a pair of grid controlled tubes; and a plural grid tube connected between the first and second trigger circuit for controlling the stable condition of the second trigger circuit; said plural grid tube having its control grid connected to a control grid of one of the tubes of the first trigger circuit whereby said first trigger circuit is operable at a speed commensurate with its maximum individual operating speed.

CARL A. BERGFORS.

REFERENCES CITED

The following references are of record in the file of this patent:

UNITED STATES PATENTS

| Number | Name | Date |
|---|---|---|
| 2,349,810 | Cook | May 30, 1944 |
| 2,407,320 | Miller | Sept. 10, 1946 |
| 2,409,689 | Morton et al. | Oct. 22, 1946 |
| 2,418,521 | Morton et al. | Apr. 8, 1947 |
| 2,462,275 | Morton et al. | Feb. 22, 1949 |

OTHER REFERENCES

Proceedings of the Royal Society of London, Series A, vol. 136–1932. "A Thyratron Scale-of-Two Automatic Counter" by Wynn-Williams, pages 312–324.

Article: "A Scale of Eight Impulse Counter" by Shepherd et al. pages 425–426, of vol. 7 of Review of Scientific Instruments of November 1936–2.

Review of Scientific Instruments, vol. 8, Nov. 1937, "A Vacuum Tube Circuit For Scaling Down Counting Rates" by Stevenson et al. pages 414–416.

Review of Scientific Instruments, vol. 9, Mar. 1938, "A Triode Vacuum Tube Scale-of-Two Circuit" by Lifschutz et al., pages 83–89.

Electronics, June 1944, "A Four-Tube Counter Decade" by Potter, pages 110–113, 358 and 360.